Oct. 26, 1965   P. W. LONG   3,213,993
ROLLER CONVEYORS
Filed Sept. 3, 1963   8 Sheets-Sheet 1
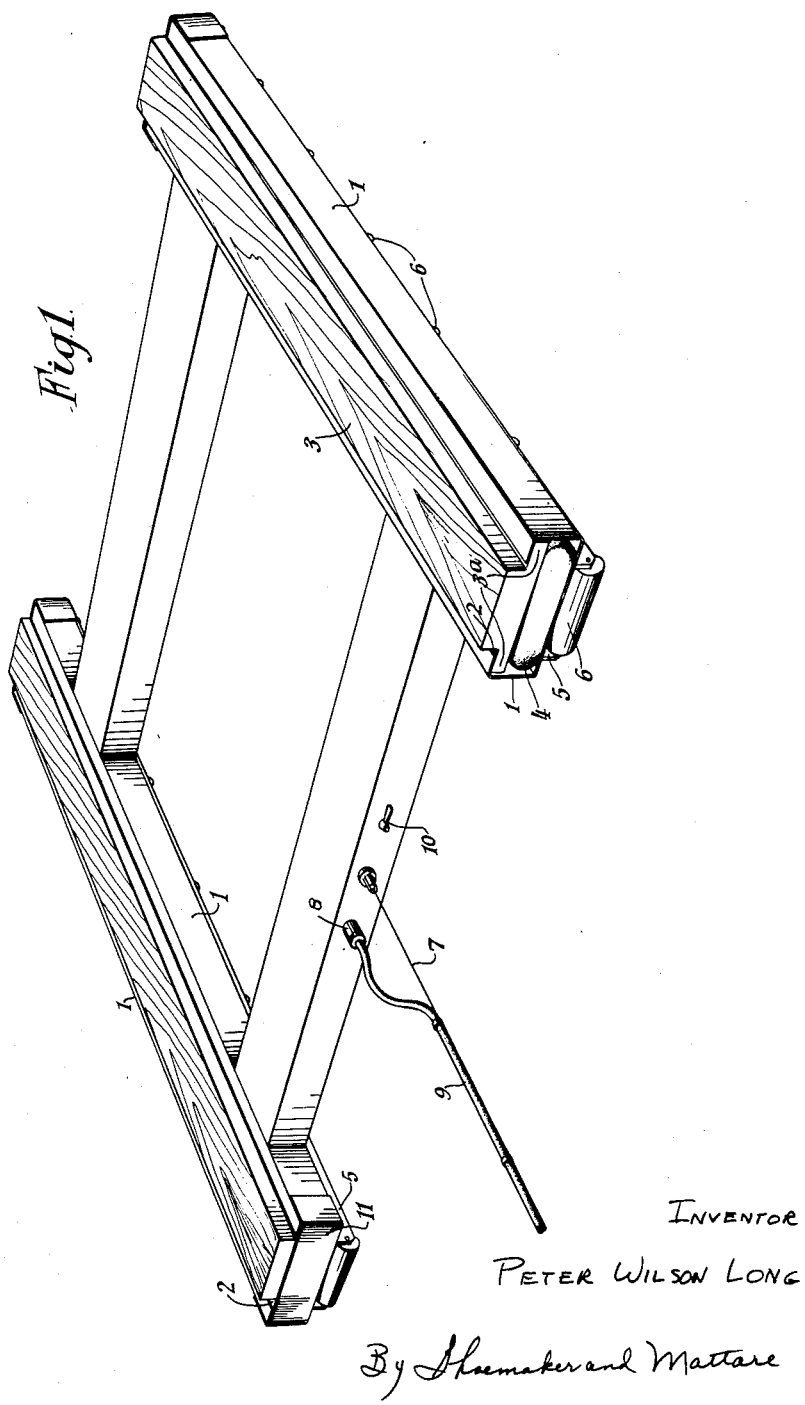
INVENTOR
PETER WILSON LONG
By Shoemaker and Mattare
ATTYS.

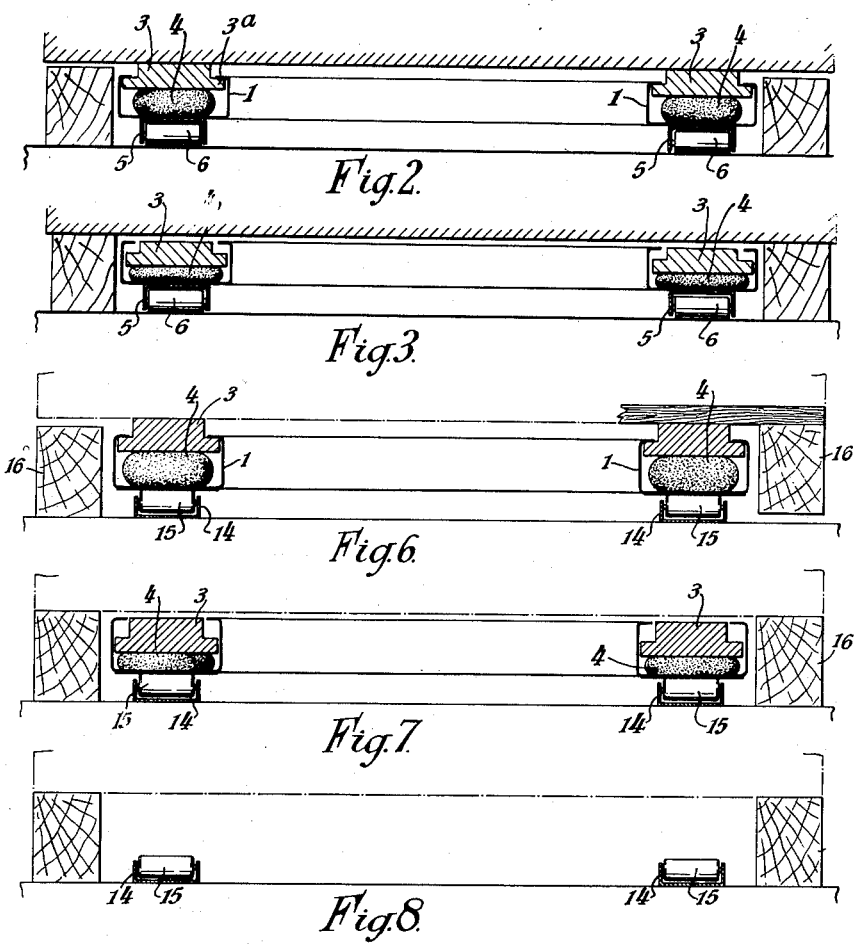

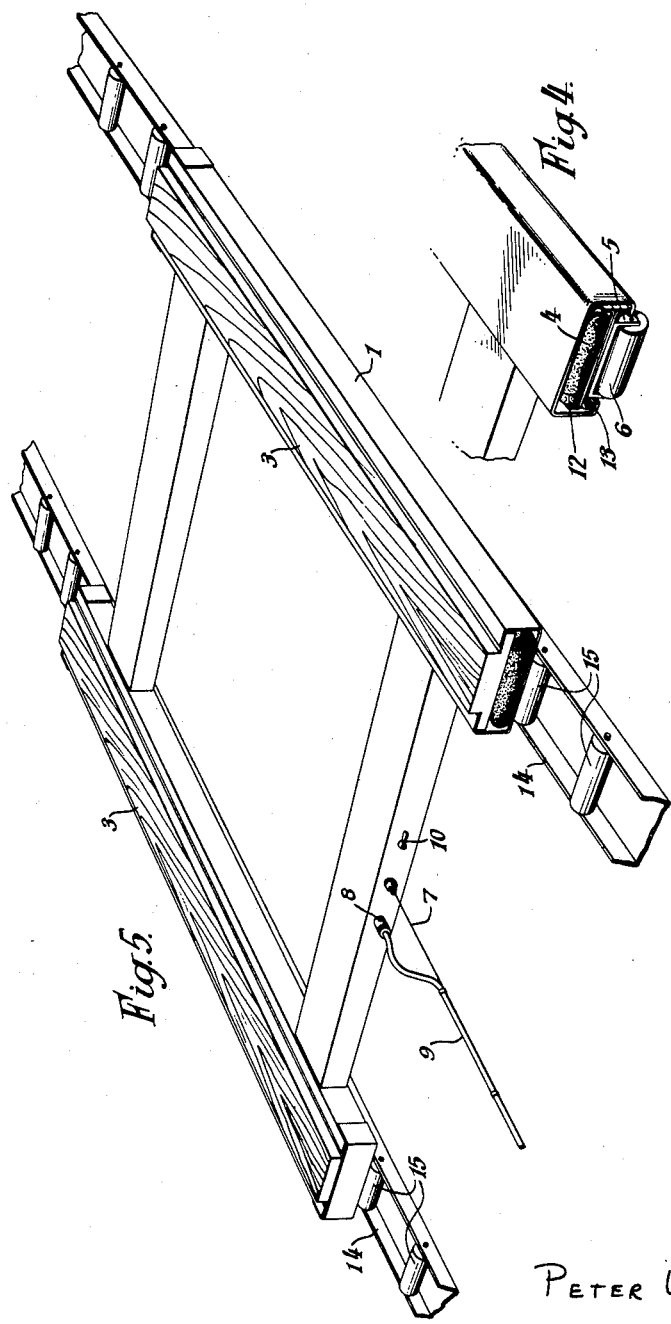

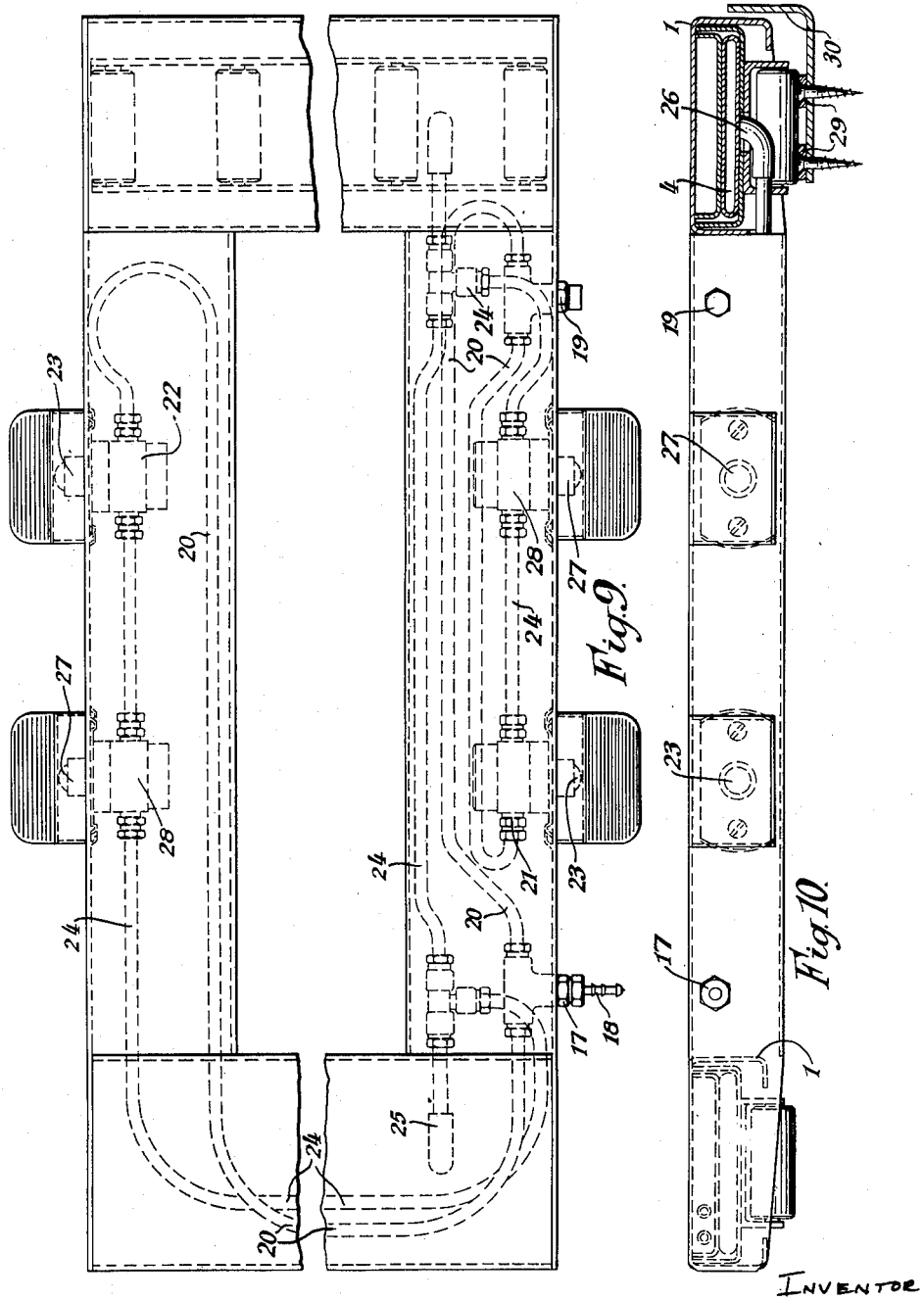

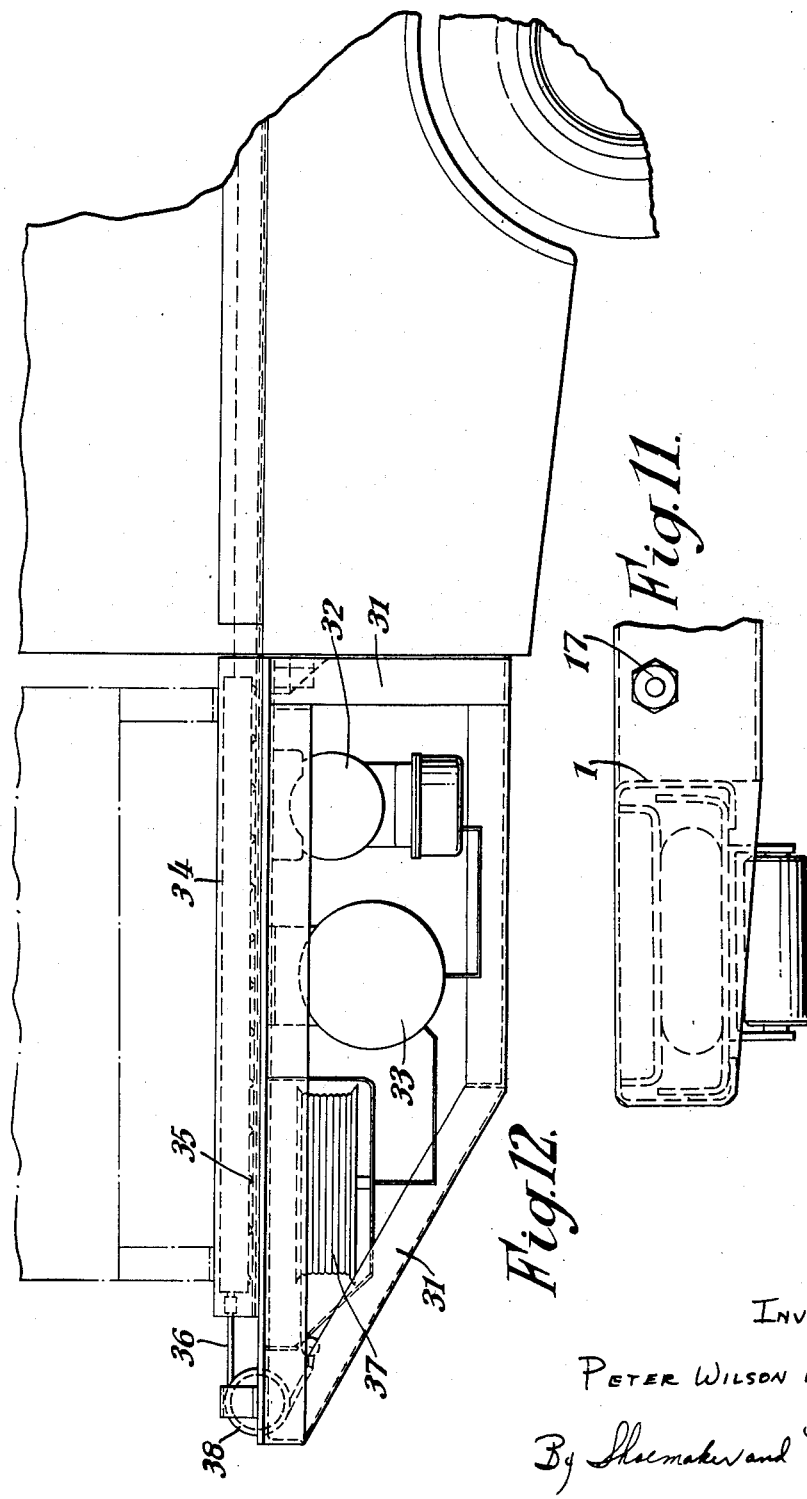

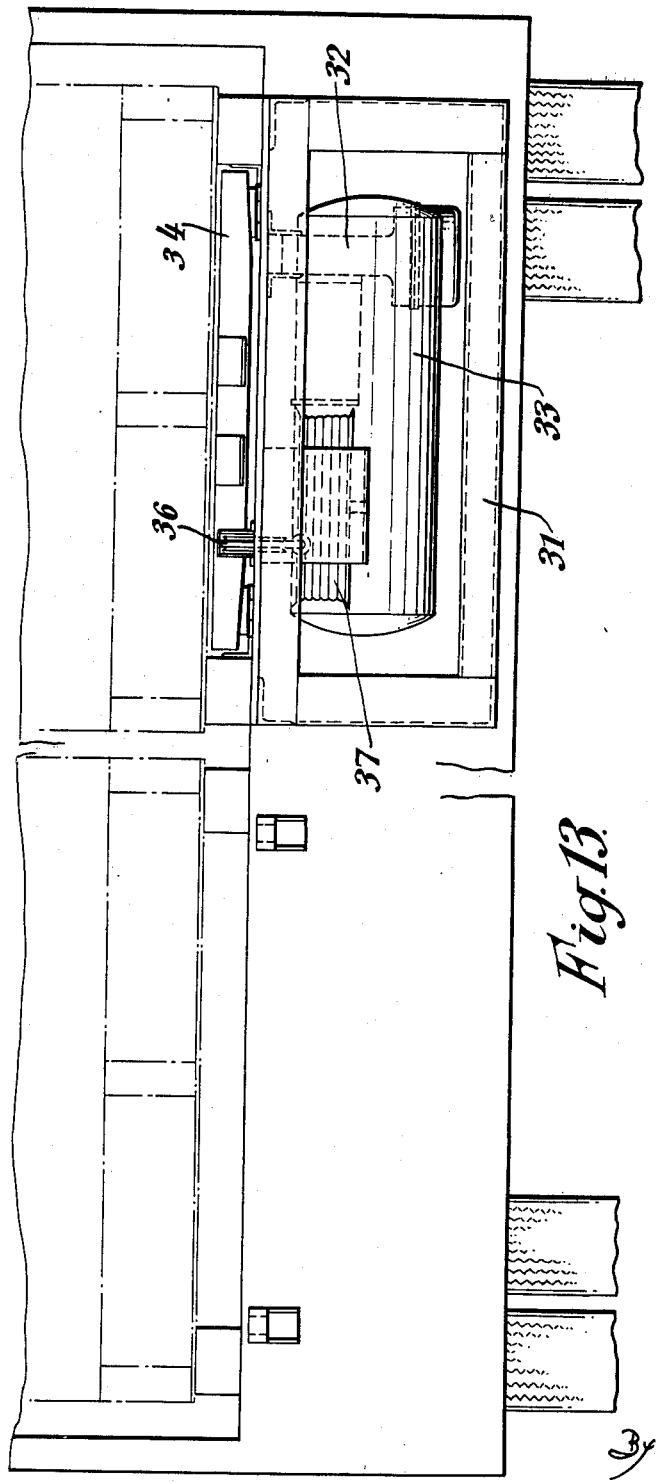

Oct. 26, 1965 P. W. LONG 3,213,993
ROLLER CONVEYORS
Filed Sept. 3, 1963 8 Sheets-Sheet 7
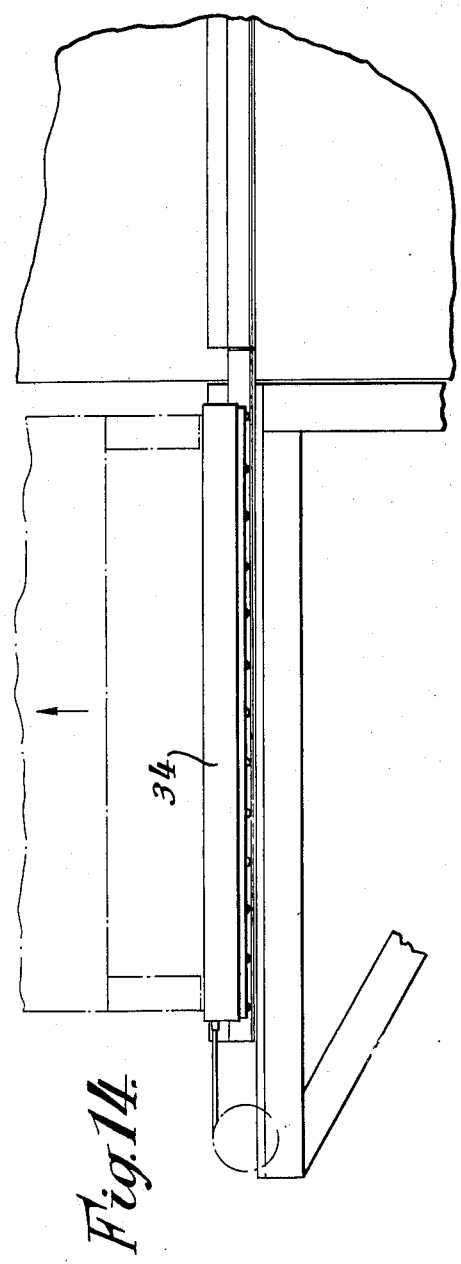
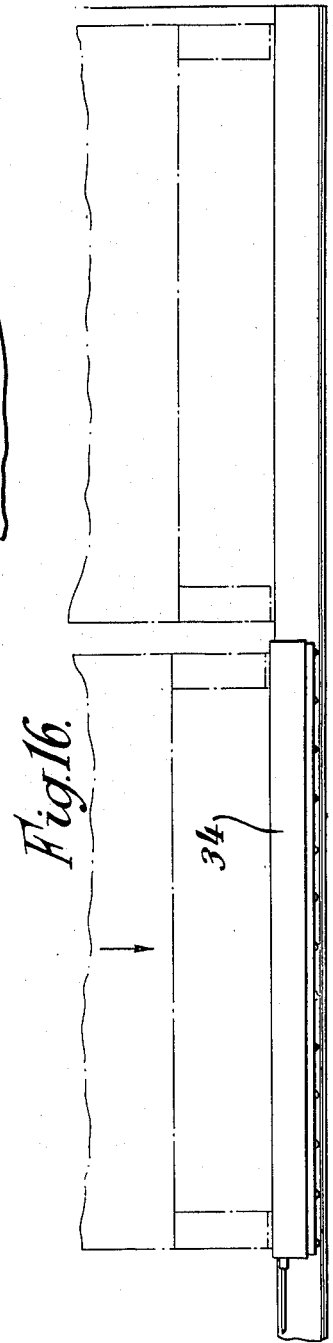
INVENTOR
PETER WILSON LONG
By Shoemaker and Mattare
ATTYS.

Oct. 26, 1965  P. W. LONG  3,213,993
ROLLER CONVEYORS
Filed Sept. 3, 1963  8 Sheets-Sheet 8

INVENTOR
PETER WILSON LONG
By Shoemaker and Mattare
ATTYS.

United States Patent Office 3,213,993
Patented Oct. 26, 1965

3,213,993
ROLLER CONVEYORS
Peter Wilson Long, Mobberley, Knutsford, England, assignor to Welded & Allied Products Limited, Manchester, England
Filed Sept. 3, 1963, Ser. No. 306,217
Claims priority, application Great Britain, Sept. 5, 1962, 33,944/62
2 Claims. (Cl. 193—35)

In our earlier application for patent, No. 181,019, now Patent No. 3,130,829, we have set forth a conveyor for the transport of goods which comprised a series of rotary elements (usually rollers) supported by an inflatable means within an elongated housing, the arrangement being such that when said means was inflated the rotary elements were lifted above a reference surface so that any goods resting on them were then mobile, whereas with the said means deflated the rotary elements were positioned below said reference surface, any goods lowered on to that surface by the collapse of the inflatable means then being immobile.

The object of the present invention is to provide further improvements in this type of conveyor, and in particular to provide conveyors of a portable or semi-portable type adapted for use with all kinds of loads, including palletted goods or suitably packed goods, e.g. boxes, cases, cartons and the like, and including also stillages and, in some instances, unpacked goods. The conveyor is useful for example in a factory or warehouse or in the loading and unloading of goods to and from and on and off a vehicle. It is also an object of the invention to provide forms of conveyor adaptable to a road vehicle or the like, interchangeable, whereby the movement of goods over the floor of the vehicle, as when loading and unloading can be greatly facilitated.

According to this invention one or more longitudinal members is or are provided (i.e. longitudinal in the direction of intended movement of the goods) and each such member includes a channel-sectioned container, an elongated support held captive in said contained and movable between a position wholly within the channel and a position partly external to said channel, one or more elongated inflatable bags between said casing and said support for effecting relative movement between said positions, and a series of transversely-arranged rollers or of captive balls making said channel mobile, at least in the direction of its own length. In some cases said rollers or balls will be built into the device but in other cases they will be provided separately as a sort of track on which the conveying device will ride.

Normally there will be two such longitudinal members, braced together by cross ties and forming an integral transportable unit.

The invention contemplates at least two general types of construction, in one of which the said rollers or captive balls are carried by and extend downwardly from the channel-sectioned container, their bearing mountings being attached to the underside of the said container, and in the other of which the rollers or captive balls are carried by a separate part which may be mounted on a floor or on a vehicle deck or the like. In the latter case the said channel-sectioned container may actually form part of a pallet.

In our said earlier specification the reference surface on which the goods were immobilized and from which they could be lifted was level with the top surface of the channel-sectioned container. In the present case, for use with pallets or stillages or the like, the reference surface is below such container and the improved conveyor is adapted to be inserted below a pallet or stillage in the space between the depending sides or corners thereof.

The said elongated support which rises and falls in the container may be in a continuous member such as a wooden beam or it may be of an openwork character such as a metal grating or a metal or wooden lattice or/and lath arrangement.

The invention in some of its forms provides a self-contained unit attachable at will say to the rear of a motor vehicle or to the edge of a loading dock or the like, such unit comprising a source of compressed air, at least one of the inflatable pallets movable between the unit and the vehicle or dock and means for paying out and drawing in a hose connection between said compressed air source and the pallet as the pallet partakes of its said movement.

The accompanying drawing illustrates several of the various possible embodiments of the invention. In the drawing:

FIG. 1 is a perspective view of one form of the invention, made mobile by having rollers incorporated in it;

FIG. 2 is a cross section showing the invention in use with a load raised and mobile;

FIG. 3 is a view corresponding to FIG. 2 but with the load lowered and immobile;

FIG. 4 is a fragmentary perspective view of a modified form of the invention;

FIG. 5 is a view corresponding to FIG. 1, showing a form of the invention made mobile by being mounted on a separately laid track;

FIGS. 6, 7 and 8 are cross sections of the arrangement shown in FIG. 5, showing respectively the mobile load, the immobile load and the load and track after withdrawal of the inflatable means;

FIG. 9 is a plan of a form of the invention showing the connections for the fluid pressure and control valves therefor;

FIG. 10 is a part-sectional end view of the structure shown in FIG. 9 with the platform lowered; and FIG. 11 is a fragmentary end view of the same with the platform raised;

FIG. 12 shows in side view one of the above-mentioned self-contained units attached to a motor vehicle;

FIG. 13 is a rear view of the same; and

FIGS. 14–17 are diagrammatic views illustrating the use of the unit shown in FIGS. 12 and 13.

Figure 15:
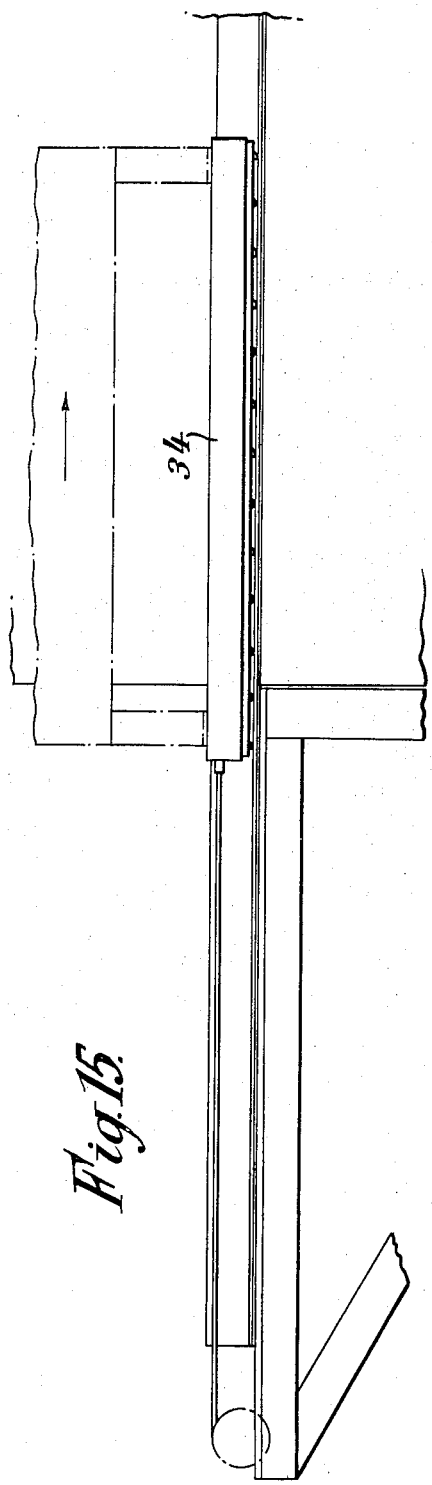

Referring first to FIGS. 1–3, which show a conveyor suitable for use say on a warehouse floor or factory floor, or on the deck or platform of a goods vehicle, there are two channel-shaped members 1 each having the top of the channel upwards and the side walls turned inwards as flanges with a wide gap 2 between them. In each channel is a wooden beam and/or tray 3 having longitudinal flanges 3a to lie opposite the said flanges of the channel, and having an upstanding central longitudinal part to rise between the channel flanges into the said gap 2. Between said beam and/or tray 3 and the bottom wall of the channel 1 there is an inflatable bag 4, for example as set forth in our said earlier specification and this will have a surrounding inextensible sheath as is described in that earlier specification.

Below the bottom wall of the said channel 1 is a further but narrower channel 5, inverted, the backs of the two channels being secured together as by welding. A series of transverse rollers 6 are mounted in the depending side walls of this further channel 5 and these make the structure mobile at all times. The structure may be passed under a pallet or other load, the bag 4 then inflated, thus lifting the above-mentioned beam and/or tray 3, and the conveyor is then moved away, taking the pallet with it. A suitable drag-line 7 and/or a connection for a pull handle will be provided and there is a connection 8 for an air line 9, and a deflation valve 10. The ends of the channels 1 are closed in by caps or covers 11, one of which has been removed in FIG. 1 to show the interior structure.

FIG. 4 shows a modification of the arrangement in which instead of the load being carried by the beam 3 it is carried by the channel 1, the channel being inverted relatively to what is shown in FIG. 1. Also, instead of the beam 3, there is shown in FIG. 4 a pair of back to back channels 12, 13 one of which encloses an inflatable bag 4 and the other of which carries the inverted channel 5 for the transport rollers 6. The flanges of the said channels 12 and 13 limit the movements of the channel 1 upwards and downwards.

Referring now to FIGS. 5 to 8 there is shown a different form of the device in which the mobility is obtained by the sliding of the channels 1 over separately laid tracks. As shown, there are open-topped channels 14, carrying transport rollers 15 and these are adapted to be laid on the floor of a warehouse or vehicle and may in fact be secured in position. The device is intended for use mainly with pallets or stillages having depending blocks or runners 16, see FIGS. 6 to 8, these blocks or runners leaving a space or tunnel into which the conveyor may enter.

In this case the channel 1 has its opening 2 at the top, as shown in FIG. 1, and the underface of the channel runs or rides on the rollers 15. FIG. 6 shows the pallet or stillage raised from the floor and mobile; FIG. 7 shows the same lowered down on to the floor by the deflation of the bag 4 and therefore immobile and FIG. 8 shows the stillage alone after the withdrawal of the conveyor, the tracks 14 remaining in their usual position. The tracks may be secured in or on the deck of a vehicle or warehouse floor or other places of use, and may be let into recesses or channels so as to have only the upper parts of the rollers above floor level.

Referring now to FIGS. 9, 10 and 11, more detail of the pallet construction is shown. As will be seen from FIG. 9, there are alternative inlet points for a compressed air supply, the point 17 in this case being adapted for use by provision of the nipple 18 at the point 19 being blanked off. These supply points lead to a conduit 20 which at one end of the pallet runs to the control valve 21 adapted to be operated by the user's foot, and at the other end of the pallet to a corresponding control valve 22 also adapted for foot operation. The valves 21 and 22 are of a self-closing type remaining open only so long as the users foot is on the respective control member 23. Upon the opening of either of the valves 21 or 22 compressed air supplied via the point 18 is fed to a conduit 24, which leads to the entries 25 and 26 of the inflatable bag 4. In order to lower the load by exhausting the inflated bags 4, it is necessary merely for the operator to displace one of the control members 27 to open the corresponding exhaust valve 28, thereby exhausting the said conduit 24 and the bags. As shown in FIG. 10, the pallet has the transport rollers connected to the inside of the lowering member within channel 1 and these rollers run on rails 29 carried by guide members 30 attached to the floor.

Referring finally to FIGS. 12 to 17 there is shown a self-contained transportable unit which, by means for example of a fork lift device, can be hooked on to the rear end of a vehicle as shown in FIGS. 12 and 13, or similarly can be hooked on to the end of a loading dock or platform or the like. This unit comprises a framework 31 which carries a compressor 32 driven by electric motor from a main supply, a pressure accumulator 33, a slidable platform 34 having the transport rollers 35, and a hose connection 36 which extends from the inlets to the inflatable bag system in the platform 34 to the accumulator 33. This hose system is wound on a take-up drum 37 adapted automatically to take up slack hose when the platform is brought back from the vehicle on to the unit, and to pay out hose as the platform is advanced from the unit to the vehicle. A guide pulley 38 is provided for the hose 36.

Figure 17:
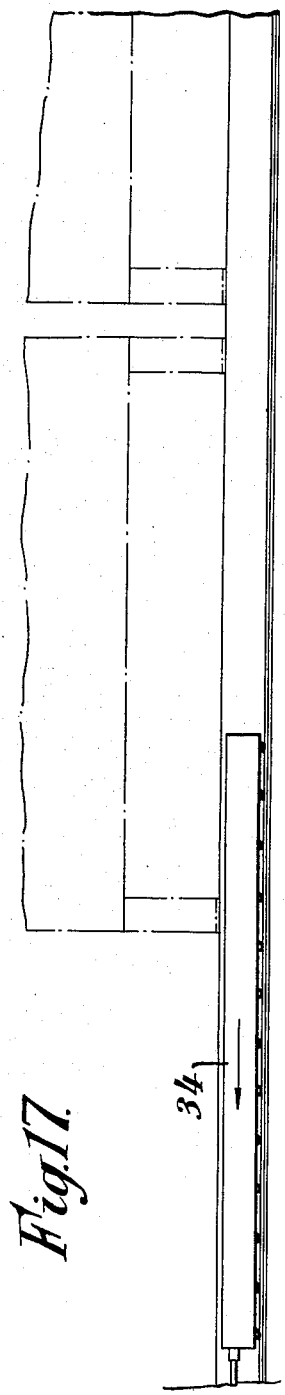

As will be seen from a consideration of FIGS. 14 to 17, the load will be placed upon the platform 34 as in FIG. 14, the platform then being raised by inflation of the bags 4 so as to become mobile, and being pushed into the vehicle as shown in FIG. 15. Thereafter the bags 4 in the platform are deflated, to lower the load on to the floor of the vehicle, whereupon the platform 34 is withdrawn as shown in FIG. 17 leaving the load behind A similar series of movements is possible (in reverse) for unloading of the vehicle. FIG. 13 shows how the unit 31 may be placed in either of the two positions on the rear of the vehicle for loading and unloading goods at each side of the vehicle.

In all cases, when the bags 4 are inflated the elongated beams are forced out of the channels 1 and lift the pallet or stillage off its support, the pallet or stillage and its load then being mobile as a whole. When the bags 4 are again deflated the said beams retract into the channels 1 and the pallet or stillage is thereby lowered until it again rests on the initial support, whereafter the further retraction of the said beams into the channels allows the conveyor to be withdrawn from below the load.

In our said earlier application we have described an inflatable bag of rubber or the like which lies within an extensible sheath or sleeve such as may be used in canvas fire hose, the sleeve being open at its ends.

It is now proposed as an alternative that said sleeve or sheath could be fabricated from a coated textile fabric folded and seamed longitudinally to form a sleeve and sealed at the ends so as completely to enclose the inner tube 4. An opening would be left in the sleeve, usually in the line of the said fold to accommodate an inlet for the inflation of the inner tube. One suitable material for the making of the outer sleeve would be neoprene-coated woven fabric.

What I claim is:

1. A roller conveyor comprising an elongated reversible roller-carrying channel unit, said channel having parallel outwardly extending flanges terminating in planar edges, rollers journalled in said flanges transversely thereof with portions thereof extending beyond the plane of the edges of the flanges, a second elongated channel in contacting relation with said unit and supported thereby, an elongated hollow member adapted to be inflated with pressure fluid mounted in said last named channel, a load supporting bar within said second channel having flanged side edges and supported by said inflatable member, and said last named channel having inturned flanges overlying the flanged side edges of the bar and limiting the outward movement thereof.

2. A roller conveyor unit comprising a pair of elongated channels positioned in contacting relation back to back, said channels having side flanges extending in opposite directions, one of said channels carrying rollers extending transversely thereof and the other of said channels carrying an elongated inflatable member, a third load supporting channel member contacted and carried by said inflatable member, said third channel member having inturned side flanges enclosing said flanges extending in opposite directions, wtih the free edges of said flanges of said one channel substantially contacting said inturned flanges.

References Cited by the Examiner

UNITED STATES PATENTS

| 2,828,027 | 3/58 | Stevenson et al. | 214—38 |
| 3,011,665 | 12/61 | Wise | 193—35 |
| 3,019,930 | 2/62 | Allen | 180—7 |
| 3,081,857 | 3/63 | Krueger | 193—35 |
| 3,130,829 | 4/64 | Long | 193—35 |

HUGO O. SCHULZ, *Primary Examiner.*

SAMUEL F. COLEMAN, *Examiner.*